United States Patent [19]

Kruger et al.

[11] Patent Number: 4,480,259

[45] Date of Patent: Oct. 30, 1984

[54] INK JET PRINTER WITH BUBBLE DRIVEN FLEXIBLE MEMBRANE

[75] Inventors: William P. Kruger, Los Altos Hills; John L. Vaught, Palo Alto, both of Calif.

[73] Assignee: Hewlett-Packard Company, Palo Alto, Calif.

[21] Appl. No.: 403,824

[22] Filed: Jul. 30, 1982

[51] Int. Cl.$^3$ .............................................. G01D 15/18

[52] U.S. Cl. .............................................. 346/140 R

[58] Field of Search .............................................. 346/140

[56] References Cited

U.S. PATENT DOCUMENTS

| | | | |
|---|---|---|---|
| 3,747,120 | 7/1973 | Stemme | 346/140 X |
| 4,021,818 | 5/1977 | Van Vloten | 346/140 |
| 4,380,018 | 4/1983 | Andoh | 346/140 |

*Primary Examiner*—Joseph W. Hartary
*Attorney, Agent, or Firm*—Douglas A. Kundrat; Joseph H. Smith

[57] ABSTRACT

An apparatus is disclosed for propelling ink droplets from an ink jet nozzle which uses an expanding bubble as a driving mechanism. Unlike other thermal ink jet devices, the ink itself is not used to provide the driving bubble. Rather a two fluid system is disclosed whereby a flexible membrane is used to maintain separation between a working fluid and the ink. A bubble is thermally created in the working fluid which distends the membrane and causes ink on the other side of the membrane to be expelled from an ink jet orifice. The membrane is in direct physical contact with the surface of the bubble-generating resistor and a quantity of the working fluid lies between the resistor and the membrane in pockets created by roughening the surface of the membrane or by roughening the surface of the resistor; alternatively, pockets between the membrane and the resistor may be provided by particulates contained within the working fluid which provide local separations of the membrane and the resistor.

7 Claims, 5 Drawing Figures

INK JET PRINTER WITH BUBBLE DRIVEN FLEXIBLE MEMBRANE

BACKGROUND OF THE INVENTION

Recent advances in data processing technology have spurred the development of a number of high speed devices for rendering permanent records of information. Alphanumeric non-impact printing mechanisms now include thermal, electrostatic, magnetic, electrophotograghic, ionic, and, most recently, bubble jet systems. This latter relatively new development is described in detail in the following U.S. Pat. No. 4,243,994 entitled LIQUID RECORDING MEDIUM by Hajime Kobayashi, et al, issued Jan. 6, 1981; U.S. Pat. No. 4,296,421 entitled INK JET RECORDING DEVICE USING THERMAL PROPULSION AND MECHANICAL PRESSURE by Toshitami Hara, et al, issued Oct. 20, 1981; U.S. Pat. No. 4,251,824 entitled LIQUID JET RECORDING METHOD WITH VARIABLE THERMAL VISCOSITY MODULATION by Toshitami Hara, et al, issued Feb. 17, 1981; and U.S. Pat. No. 4,313,124 entitled LIQUID JET RECORDING PROCESS AND LIQUID JET RECORDING HEAD by Toshitami Hara, issued Jan. 26, 1982. Also see copending U.S. patent application Ser. No. 292,841 by John L. Vaught, et al.

In its simplest configuration, the bubble jet printing system consists of a capillary tube containing ink, with one end of the capillary communicating with an ink reservoir and the other end open to permit ejection of an ink droplet. Also included is a resistor either within the capillary or in close proximity to it, providing a sudden burst of thermal energy within the capillary. This burst of energy causes the ink to vaporize in a local region, creating a bubble in the capillary whose sudden expansion creates a pressure wave in the ink and causes an ink droplet or droplets to be expelled from the open end of the capillary.

Although it is not discussed in the above-referenced patents, the best control over the ejection of droplets is obtained when the device is operated in the closed mode, ie. when the bubble is permitted to collapse within the capillary rather than when the ink vapor is permitted to be vented to the outside with the ejection of the droplets. A major problem associated with this closed mode method of printing is that the bubble has a tendency to collapse on or near the resistor, thereby subjecting the resistor to damage each time the bubble collapses. Another difficult problem associated with this method of ink jet printing is that it requires the development of new kinds of inks which can withstand thermal shock without developing significant changes in their physical or chemical composition. Further, the chemical properties of the ink can themselves damage the resistor, especially during bubble collapse. As a result, one of the significant problems in bubble jet technology is resistor lifetime.

To date, typical solutions to the resistor lifetime problems have dealt with protective coatings on the resistor, with special ink formulations which are chemically less damaging to the resistor, and with flexible substrate materials. However, none of the prior art solutions has considered the use of a bubble to drive the ink from the capillary without actually vaporizing the ink.

SUMMARY OF THE INVENTION

In accordance with the illustrated preferred embodiments, the present invention provides an ink-containing capillary having an orifice for ejecting ink and an adjacent chamber for containing another liquid which is to be locally vaporized as in the typical bubble jet system. Between the two capillaries is a flexible membrane for transmitting the pressure wave from the vapor bubble in the adjacent capillary to the ink-containing capillary, thereby causing the ejection of a drop or droplets of ink from the orifice.

A major advantage of the present invention over the prior art is that this new configuration permits a separation of the fluid to be vaporized from the ink. This separation permits the use of conventional ink formulations, while at the same time making it possible to use special formulations of non-reactive and/or high molecular weight fluids in the bubble-forming chamber in order to prolong resistor lifetime.

DETAILED DESCRIPTION OF THE INVENTION

Figure 1:
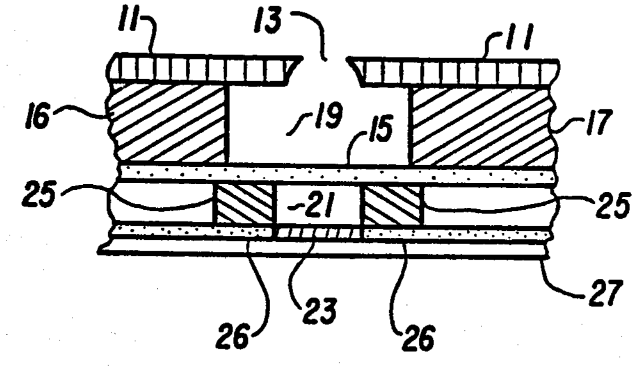
FIG. 1 is a cross-sectional view of a device according to the invention.

In accordance with a preferred embodiment of the invention, there is shown in FIG. 1 a cross-sectional view through an ink jet print head. The device includes a top 11 having a hole which acts as an orifice 13 for ejecting ink. Opposite top 11 is a flexible membrane 15 which together with spacers 16 and 17 provide a cavity 19 for containing ink. Shown directly below flexible membrane 15 is a second cavity 21 for holding a working fluid. This second cavity is bounded below by a resistor 23 and on the sides by two other barriers 25, barriers 25 and resistor 23 typically being supported by a substrate 27. Also shown are two conductors 26 for supplying power to resistor 23.

In operation, a voltage pulse is applied to resistor 23 to cause joule heating and sudden vaporization of a portion of the working fluid in cavity 21, thereby forming a bubble under flexible membrane 15. The expansion of this bubble causes flexible membrane 15 to be distended resulting in a local displacement of the membrane and in the transmission of a pressure pulse to the ink in cavity 19. This pressure pulse then ejects a drop or droplets of ink from orifice 13. Also, by appropriately controlling the energy input to resistor 23, the bubble will collapse quickly back onto or near resistor 25 so that repeated operation is practical.

Materials for construction of the ink jet head shown in FIG. 1 can vary widely depending on the desired method of construction. In a typical configuration, top 11 is constructed of an inert rigid material such as etched silicon, mylar, glass, or stainless steel, usually on the order of 1 mil in thickness. Typical orifice dimensions are approximately 3 mils across. Spacers 16 and 17 provide only a small separation of the membrane from the orifice in order to permit adequate energy transfer to the ink and at the same time must be appropriate in size to insure filling of cavity 19 by capillary action. For a typical configuration using water-based inks, spacers 16 and 17 are approximately 1 to 2 mils thick and are spaced apart on the order of 5 mils or more, the materials requirements usually being similar to those of top 11. Barriers 25 are usually on the order of 1 to 2 mils thick and can be constructed of a variety of materials such as glass, silicon, photopolymer, glass bead-filled epoxy, or electroless metal deposited onto the substrate. Suitable materials for resistor 23 are platinum, titanium-tungsten, tantalum-aluminum, diffused silicon, or some amorphous alloys. Other materials would also clearly be appropriate for these various functions, however, some care must be taken to avoid materials which will be corroded or electroplated out with the various working fluids which might be used. For example, with water-based working fluids, both aluminum and tantalum-aluminum exhibit these problems at the currents and resistivities typically used (i.e. with resistors in the range of 3 to 5 ohms and currents on the order of 1 amp.) Customary dimensions for resistor 23 usually range from 3×3 mils, to 5×5 mils, and serve to set the order of magnitude for the separation of barriers 25.

Flexible membrane 15 is the key to the operation of the device shown in FIG. 1. Generally, the membrane is constructed of a thin film of silicone rubber, although other materials may also exhibit sufficient elongation to be useful as a membrane. These thin films are typically made by diluting Dow-Corning 3140, or 3145 RTV with trichloroethane and then applying a dip and drain, or spin on, application to an etchable surface such as aluminum. Once the aluminum is etched away, a pinhole free thin film is left which can be attached to barriers 25 and spacers 16 and 17 by mechanical compression, thermal compression bonding, or adhesive bonding. Good results are obtained with a film thickness of approximately 8 to 12 microns, the film thickness being controlled by the amount of dilution of the silicone rubber.

Figure 2:
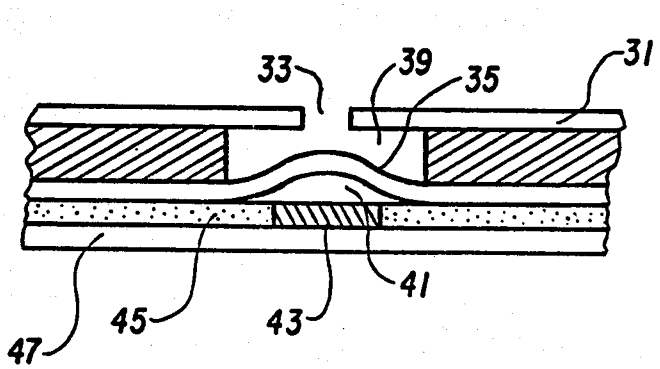
FIG. 2 is a cross-sectional view of another device according to the invention.

In FIG. 2 is shown another embodiment of the invention which uses the fact that very little working fluid is required to produce a sufficient bubble to cause ejection of ink droplets. In this embodiment barriers 25 of FIG. 1 are eliminated and a flexible membrane 35 is placed in direct contact with a resistor 43. Generally, only a few microns of working fluid immediately adjacent to the resistor contribute to the bubble volume. Hence, by providing a rough surface on the resistor or on the membrane, there is sufficient local separation between the two surfaces to supply an adequate volume of working fluid for bubble formation. This is illustrated in FIG. 2 by showing a bubble 41 creating a local deformation of membrane 35, membrane 35 extending a sufficient distance into an ink-containing cavity 39 to cause ejection of droplets from an orifice 33. Also shown in FIG. 2 is an electrical conductor 45 to supply electrical power to resistor 43.

Generally, the dimensions, methods of construction, and choices of materials are substantially the same for the embodiment shown in FIG. 2 as for those discussed in regard to the embodiment of FIG. 1. Providing a rough surface on the resistor can be accomplished in a number of ways, one method, for example, being to roughen the substrate on which the resistor is deposited. It is also relatively simple to provide a rough surface to the flexible membrane by forming the membrane on a rough surface, for example by using the dip and drain method of construction on a previously etched aluminum surface. It should also be noted that a rough surface is not required at all if the working fluid were to contain particulates of some relatively inert material such as glass microbeads in order to maintain sufficient separation between the membrane and the resistor.

Figure 3:
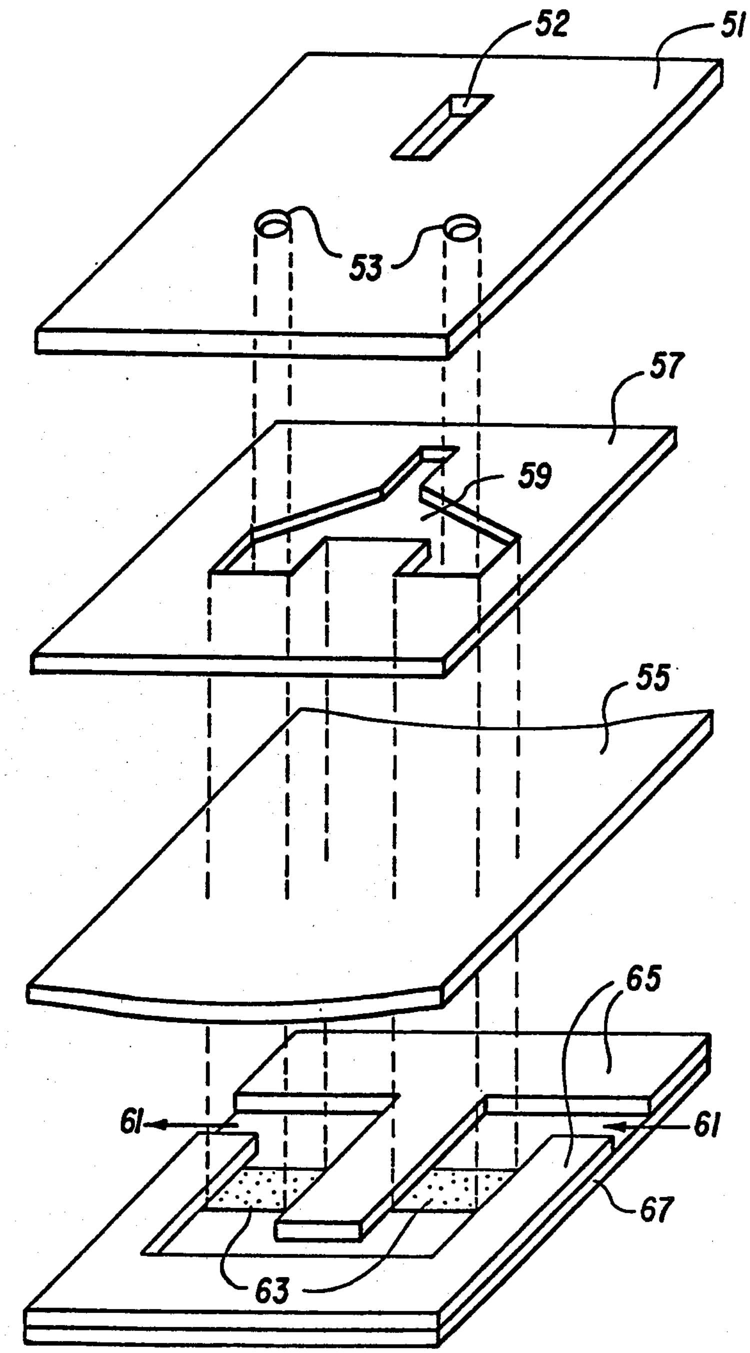
FIG. 3 is an expanded view of a device according to the invention having a plurality of orifices.

Shown in FIG. 3 is an expanded perspective of an embodiment of the invention having two orifices 53 fed from a common ink capillary channel 59. Similar to the earlier embodiments, orifices 53 are contained in a rigid top 51, with top 51 separated from a flexible membrane 55 by a spacer 57 which defines channel 59. Typically, ink is supplied to channel 59 through an ink-feed hole 52 located in top 51. In the lower portion of FIG. 3 is shown a barrier combination 65 and a substrate 67 which form a channel 61 for containing a working fluid for producing bubbles beneath membrane 55. In the usual scheme, barrier combination 65 is designed to prevent significant cross-talk between orifices, while at the same time providing a flow-through capability to fill the channel and to permit elimination of any large persistent bubbles. The problem of formation of persistent bubbles, however can usually be prevented by the addition of an appropriate surfactant to the working fluid. For example, for a working fluid of water, DOWFAX 2Al solution made by Dow Chemical Company appears to be quite satisfactory. As in the previous embodiments, resistors 63 are substantially aligned with orifices 53 to provide maximum acceleration of ink through each orifice.

Figure 4A:
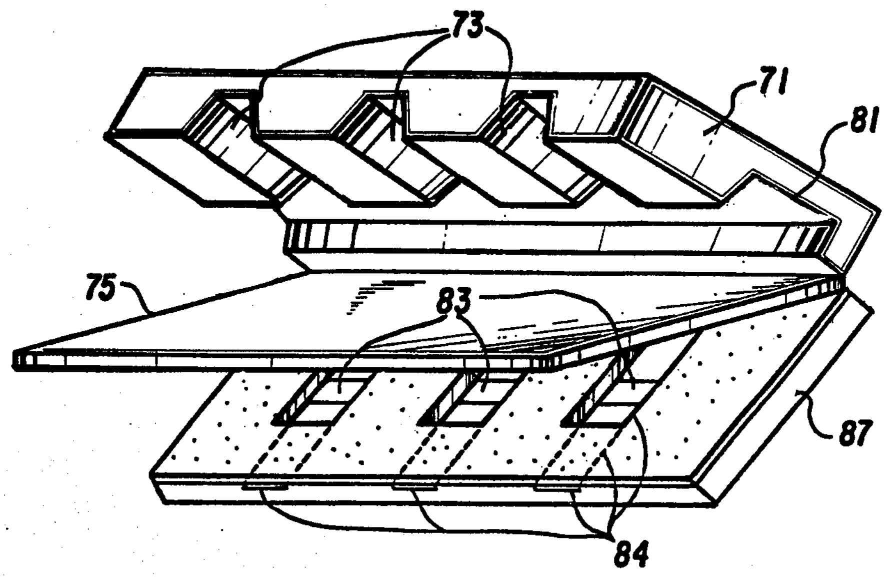
FIGS. 4A and 4B show another embodiment of a device according to the invention.
Figure 4B:
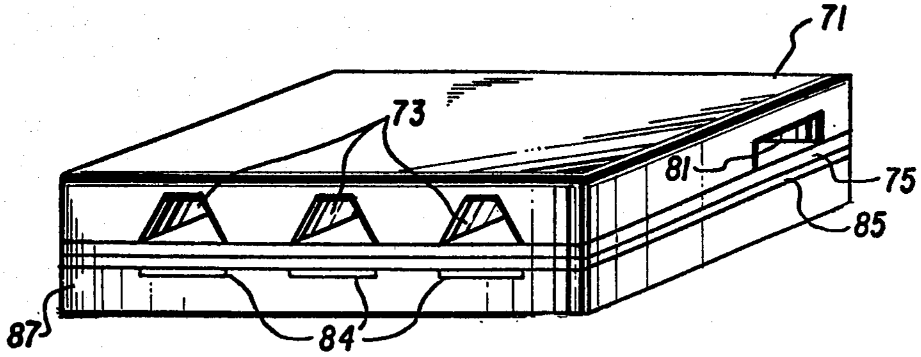

Shown in FIGS. 4A and 4B is an embodiment of the invention which has a geometry substantially orthogonal to that of the previous devices. In this embodiment, there are a plurality of orifices 73 which are no longer in alignment with their corresponding resistors 83. Instead, orifices 73 are located at the termination of ink channels cut in a top 71, the orifices being formed by the interface of top 71 and a membrane 75. Similar to previous embodiments, a barrier 85 together with a substrate 87 is used to form channels for holding the working fluid over the resistors. Also shown is an ink feed channel 81 and several conductors 84 for providing power to resistors 83.

In each of the above embodiments, there is a significant improvement over the prior art in that it is no longer necessary to be significantly concerned with the thermal and chemical properties of the fluid used for the ink. Nearly all of the present formulations of ink used in piezoelectric ink jet technology can also be used with the above invention, unlike many prior art thermal ink jet systems. Another significant advantage of the invention is that it permits a wide selection of working fluids, conductors and resistors without having to worry about wetting characteristics, and other similar problems associated with ink formulations. Additionally, the invention permits independent optimization of both the ink and the working fluid, optimization of the working fluid being especially important in providing a sufficiently long lifetime for resistors used in the device.

What is claimed is:

1. A print head comprising:

a cavity for containing ink;

an orifice in communication with the cavity;

a resistor;

a flexible membrane overlaying the resistor and having a surface in direct physical contact with a surface of the resistor, the flexible membrane being positioned to separate the resistor from the cavity; and pockets, located between the surface of the flexible membrane and the surface of the resistor, for containing a working fluid.

2. A print head as in claim 1, wherein the flexible membrane comprises silicone rubber.

3. A print head as in claim 1, wherein the surface of the flexible membrane is rough and the pockets are thereby provided.

4. A print head as in claim 1, wherein the surface of the resistor is rough and the pockets are thereby provided.

5. A print head as in claim 4, wherein the resistor is fabricated upon a substrate having a rough surface.

6. A print head as in claim 1, wherein the working fluid contains particulates which are operative for creating the pockets by providing local separations between the surface of the flexible membrane and the surface of the resistor.

7. A print head as in claim 6, wherein the particulates comprise glass microbeads.

* * * * *